UNITED STATES PATENT OFFICE.

ARNOLD WIENS, OF BITTERFELD, GERMANY.

PROCESS OF MAKING OXALATES.

SPECIFICATION forming part of Letters Patent No. 714,347, dated November 25, 1902.

Application filed August 25, 1902. Serial No. 120,935. (No specimens.)

*To all whom it may concern:*

Be it known that I, ARNOLD WIENS, a subject of the Emperor of Germany, residing at Bitterfeld, Germany, have invented a certain new and useful Process for the Preparation of Oxalates from Formates, of which the following is a specification.

This invention relates to a process of preparing oxalates from formates.

According to the patent of the United States No. 659,733 the formate used in the preparation of oxalate is mixed with soda and then heated to from 360° to 400° centigrade. This method of preparation of oxalate is, however, attended with the grave disadvantage that in order to recover the soda which has been mixed with the formate it has to be extracted by lixiviation, the solution being afterward evaporated and calcined. These are very inconvenient and costly accessory operations, all the more objectionable as the amount of soda which must be mixed with the formate is larger than the amount of oxalate that can be obtained by the process. Now this process may in accordance with the present invention be considerably simplified by mixing with the formate not soda, but oxalate prepared beforehand and by heating the mixture to from 360° to 410° centigrade. In this case also a reaction takes place; but the evaporation and calcination of the soda solution become unnecessary.

What I claim as my invention, and desire to secure by Letters Patent, is—

1. A process for the preparation of oxalates, consisting in heating a mixture of formates with oxalates.

2. A process of the preparation of oxalates consisting in heating a mixture of formates with oxalates to a temperature of from 360° to 410° centigrade.

In testimony whereof I have signed my name to this specification in the presence of two subscribing witnesses.

ARNOLD WIENS.

Witnesses:
   HENRY HASPER,
   WOLDEMAR HAUPT.